US012142766B2

(12) United States Patent
Lin et al.

(10) Patent No.: US 12,142,766 B2
(45) Date of Patent: Nov. 12, 2024

(54) SILICON-BASED COMPOSITE ANODES FOR HIGH ENERGY DENSITY, HIGH CYCLE LIFE SOLID-STATE LITHIUM-ION BATTERY (71) Applicant: Solid Energies Inc., Santa Ana, CA (US)

(72) Inventors: Zhigang Lin, Santa Ana, CA (US); Kevin Zanjani, Santa Ana, CA (US)

(73) Assignee: Solid Energies Inc., Santa Ana, CA (US)

( * ) Notice: Subject to any disclaimer, the term of this patent is extended or adjusted under 35 U.S.C. 154(b) by 0 days.

(21) Appl. No.: 18/530,950

(22) Filed: Dec. 6, 2023

(65) Prior Publication Data
US 2024/0113299 A1 Apr. 4, 2024

Related U.S. Application Data (62) Division of application No. 17/329,088, filed on May 24, 2021, now Pat. No. 11,888,162.

(51) Int. Cl.
H01M 4/62 (2006.01)
H01M 4/02 (2006.01)
(Continued)

(52) U.S. Cl.
CPC .......... H01M 4/622 (2013.01); H01M 4/364 (2013.01); H01M 4/366 (2013.01); H01M 4/386 (2013.01);
(Continued)

(58) Field of Classification Search
CPC ...... H01M 4/622; H01M 4/364; H01M 4/366; H01M 4/386; H01M 4/587; H01M 4/483;
(Continued)

(56) References Cited

U.S. PATENT DOCUMENTS 5,319,517 A 6/1994 Nomura et al.
5,670,272 A 9/1997 Cheu et al.
(Continued)

FOREIGN PATENT DOCUMENTS

CN 109119618 A 1/2019
CN 111710817 A 9/2020

OTHER PUBLICATIONS

Kasavajula, U.S., et al., "Composite anode material with mixed conductivity for solid state lithium ion battery," American Institute of Chemical Engineers, 2004.

Primary Examiner — Sarah A. Slifka
(74) Attorney, Agent, or Firm — DLA Piper LLP (US)

(57) ABSTRACT

High energy density and long cycle life all solid-state electrolyte lithium-ion batteries use ceramic-polymer composite anodes which include a polymer matrix with ceramic nanoparticles, silicon-based anode active materials, conducting agents, lithium salts and plasticizer distributed in the matrix. The silicon-based anode active material are anode active particles formed by high energy milling a mixture of silicon, graphite, and metallic and/or non-metallic oxides. A polymer coating is applied to the particles. The networking structure of the electrolyte establishes an effective lithium-ion transport pathway in the electrode and strengthens the contact between the electrode layer and solid-state electrolyte resulting in higher lithium-ion battery cell cycling stability and long battery life.

20 Claims, 9 Drawing Sheets

Precursor high energy Ball mill
Si (40-100μm, 40-80 wt%); Graphite (40-100μm, 20-60 wt%);
TiO₂ (40-100nm, 5-15wt%) 300-360rpm, 50-100 hours Anneal
In air: 240-300°C/hr, 300-400°C, 2-4hrs Sieve
Sieve: 100-300mesh PVA coating high energy ball mill (Optional)
Si-Graphite-TiO₂ material (85-95 wt%); PVA (Mw: 31-98k, 5-15 wt%)
300-360rpm, 12-48 hours (51) Int. Cl.
    *H01M 4/36*     (2006.01)
    *H01M 4/38*     (2006.01)
    *H01M 4/48*     (2010.01)
    *H01M 4/587*     (2010.01)
    *H01M 10/0525*     (2010.01)
    *H01M 10/056*     (2010.01)
    *H01M 10/0585*     (2010.01)

(52) U.S. Cl.
    CPC ........... *H01M 4/483* (2013.01); *H01M 4/587* (2013.01); *H01M 10/0525* (2013.01); *H01M 10/056* (2013.01); *H01M 10/0585* (2013.01); H01M 2004/021 (2013.01); H01M 2004/027 (2013.01); H01M 2300/0071 (2013.01); H01M 2300/0082 (2013.01); H01M 2300/0091 (2013.01)

(58) Field of Classification Search
    CPC ........... H01M 10/0585; H01M 10/056; H01M 10/0525
    See application file for complete search history.

(56) References Cited

U.S. PATENT DOCUMENTS

| | | |
|---|---|---|
| 5,834,136 A | 11/1998 | Gao et al. |
| 5,916,515 A | 6/1999 | Bryan et al. |
| 6,040,085 A | 3/2000 | Cheu et al. |
| 6,072,688 A | 6/2000 | Hennings et al. |
| 6,328,770 B1 | 12/2001 | Gozdz |
| 6,391,069 B1 | 5/2002 | Gozdz et al. |
| 7,118,817 B2 | 10/2006 | Bartholf et al. |
| 7,604,892 B2 | 10/2009 | Yoo et al. |
| 7,611,802 B2 | 11/2009 | Kim et al. |
| 7,935,442 B2 | 5/2011 | Kim et al. |
| 8,642,211 B2 | 2/2014 | Green |
| 9,627,684 B2 | 4/2017 | Ramaswamy et al. |
| 10,297,874 B2 | 5/2019 | Omori et al. |
| 10,381,641 B2 | 8/2019 | Chen et al. |
| 10,608,236 B2 | 3/2020 | Pozin et al. |
| 10,700,362 B2 | 6/2020 | Boolish et al. |
| 11,588,176 B2 | 2/2023 | Lin et al. |
| 11,888,162 B2 | 1/2024 | Lin et al. |
| 2001/0055717 A1 | 12/2001 | Fauteux et al. |
| 2006/0216585 A1 | 9/2006 | Lee |
| 2013/0337304 A1 | 12/2013 | Luski et al. |
| 2015/0086853 A1 | 3/2015 | Matsuno et al. |
| 2016/0315310 A1 | 10/2016 | Kamo et al. |
| 2019/0036159 A1 | 1/2019 | Kim et al. |
| 2019/0044186 A1 | 2/2019 | Kim et al. |
| 2019/0051934 A1 | 2/2019 | Kim et al. |
| 2020/0067126 A1 | 2/2020 | Han et al. |
| 2020/0335814 A1 | 10/2020 | Lin et al. |
| 2020/0358088 A1 | 11/2020 | Lin et al. |
| 2020/0388798 A1 | 12/2020 | Wang et al. |
| 2021/0351398 A1 | 11/2021 | Goodman |

Precursor high energy Ball mill
Si (40-100μm, 40-80 wt%); Graphite (40-100μm, 20-60 wt%);
TiO$_2$ (40-100nm, 5-15wt%) 300-360rpm, 50-100 hours Anneal
In air: 240-300°C/hr, 300-400°C, 2-4hrs Sieve
Sieve: 100 -300mesh PVA coating high energy ball mill (Optional)
Si-Graphite-TiO$_2$ material (85-95 wt%); PVA (Mw: 31-98k, 5-15 wt%)
300-360rpm, 12-48 hours

SILICON-BASED COMPOSITE ANODES FOR HIGH ENERGY DENSITY, HIGH CYCLE LIFE SOLID-STATE LITHIUM-ION BATTERY

REFERENCE TO RELATED APPLICATION

This application is a divisional of U.S. patent application Ser. No. 17/329,088 which was filed on May 24, 2021, which is incorporated herein by reference.

FIELD OF THE INVENTION

The present invention is generally directed to solid-state lithium-ion batteries and, more particularly, to silicon-based composite anodes that are infiltrated with a network of mechanically resilient, high-ionic-conductivity electrolyte, which serves as a lithium-ion transport pathway within the electrode and strengthens the contact between the electrode layer and solid-state electrolyte separator. All-solid-state lithium-ion batteries employing the silicon-based composite anodes exhibit improved cycling stability and longer lifetimes because of silicon deformation confinement/buffering during charging/discharging.

BACKGROUND OF THE INVENTION

Lithium-ion secondary batteries typically use carbon, such as graphite, as the anode electrode. Graphite materials are very stable and exhibit good cycle-life and durability but graphite has a theoretical lithium storage capacity of only about 372 mAh/g. This low storage capacity results in poor energy density of the lithium-ion battery.

Silicon, as an anode material, offers a theoretical capacity of 4200 mAh/g that is approximately eleven times that of graphite anodes. However, typical silicon anodes have a low cycle life due to the stresses associated with the large changes in volume of 300% as the lithium ions are transported into and out of the silicon anode during the lithiation and delithiation process over repeated charging and discharging cycles. In particular, the repeated volume change causes Si particle isolation, active material and conductive material looseness, active material crack, and anode sheet crack.

In particular, with all solid-state lithium-ion batteries, the anode active material is placed between two solid components: the solid electrolyte separator layer and the metal current collector. The volume expansion of Si anode particles leads to mechanical degradation and electric contact loss which results in continuous capacity losses and poor cycling performance. The volume changes to Si anodes also introduces associated solid electrolyte interphase (SEI) instability. A SEI is formed on the surface of Si particles during the delithiation (charging) processes when the volume of Si particles expands. In the lithiation (discharging) process, as the Si particles shrink, the formed SEI layer breaks down into separate pieces, leading to the exposure of fresh Si surface in the electrolyte. In the later delithiation and lithiation cycles, new SEI layers continuously form on the Si particle surface and break down. The SEI material accumulates as the SEI layers get thicker with each cycle. The batteries exhibit high overpotential for lithiation and accelerate electrolyte consumption, and the Si active materials lose intimate contact. These batteries are characterized by capacity losses and poor cycling life.

SUMMARY OF THE INVENTION

The present invention is based in part on the development of electrolyte-infiltrated silicon-based composite anodes that are particularly suited for all solid-state lithium-ion batteries (ASSLiBs). The infiltrated electrolyte has high ionic conductivity and a robust polymer networking structure. The Si-based anode could be fabricated using established industry lines and the resultant anode sheet can be directly incorporated into the manufacturing of ASSLiBs that exhibit high energy density, long cycle life, and high charge/discharge rates.

In one aspect, the invention is directed to ceramic-polymer composite anodes that include: (i) a polymer matrix, (ii) ceramic nanoparticles that are distributed in the polymer matrix, (iii) a silicon-based anode active material that is distributed in the polymer matrix, (iv) a conducting agent that is distributed in the polymer matrix, (v) lithium salt and (vi) plasticizer. In one embodiment, the silicon-based anode active materials are anode active particles formed of a mixture of silicon, graphite, and metallic and/or non-metallic oxides. The anode active particles can include a polymer coating. A preferred technique of fabricating the anode active particles comprises high energy ball milling of the silicon, graphite and oxides to form a precursor mixture that is subjected to high temperature annealing. The anode active particles are coated with a polymer coating. The high-capacity Si-based anode active materials can be readily manufactured in large-scale facilities for use in ASSLiBs.

In another aspect, the invention is directed to an electrochemical cell that includes:
  (a) ceramic-polymer composite anode that includes: (i) a first polymer matrix, (ii) a first ceramic nanoparticles that are distributed in the first polymer matrix, (iii) a silicon-based anode active material that is distributed in the first polymer matrix, (iv) a first conducting agent that is distributed in the first polymer matrix, (v) first lithium salt and (vi) first plasticizer;
  (b) a cathode which includes a cathode active material and lithium; and
  (c) an electrolyte there between.

In yet another aspect, the invention is directed to a solid-state lithium-ion battery having a plurality of unit cells, each unit cell includes:
  (a) an electrolyte-infiltrated composite silicon-based anode that includes: (i) a first polymer matrix, (ii) first ceramic nanoparticles that are distributed in the first polymer matrix, (iii) a first lithium salt, (iv) a first plasticizer, (v) a silicon-based anode active material that is distributed in the first polymer matrix, (vi) a first conducting agent that is distributed in the first polymer matrix, and (vii) a first binder if the weight ratio of the anode active material is greater than 80 wt %;
  (b) an electrolyte-infiltrated composite cathode that includes: (i) a second polymer matrix, (ii) second ceramic nanoparticles that are distributed in the second polymer matrix, (iii) a lithium salt, (iv) a second plasticizer, (v) a cathode active material that is distributed in the second polymer matrix, (vi) a second conducting agent that is distributed in the second polymer matrix and (vii) a second binder if the weight ratio of the cathode active material is greater than 80 wt %; and
  (c) interposed the between the anode and the cathode, a solid-state electrolyte which comprises a ceramic-polymer composite electrolyte membrane that includes: (i) a third polymer matrix, (ii) third ceramic nanoparticles with diameters that range from 10 to 2000 nm and that are distributed in the third polymer matrix, (iii) third plasticizer (iv) third lithium salt, wherein the third ceramic nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$.

In a further aspect, the invention is directed to a process for fabricating a solid-state lithium-ion battery cell which includes:

(a) providing a ceramic-polymer-infiltrated composite silicon-based anode that includes: (i) a first polymer matrix, (ii) first ceramic nanoparticles that are distributed in the first polymer matrix, (iii) a first lithium salt, (iv) a first plasticizer, (v) an anode active material that is distributed in the first polymer matrix, (vi) a first conducting agent that is distributed in the first polymer matrix, (vii) a first binder if the weight ratio of the anode active material is greater than 80 wt %;

(b) providing a ceramic-polymer-infiltrated composite cathode that includes: (i) a second polymer matrix, (ii) second ceramic nanoparticles that are distributed in the second polymer matrix, (iii) a second lithium salt, (iv) a second plasticizer, (v) a cathode active material that is distributed in the second polymer matrix, (vi) a second conducting agent that is distributed in the second polymer matrix, (vii) a second binder if weight ratio of cathode active material is high greater than 80 wt %; and (c) forming a sold-state electrolyte between the cathode and anode which includes ceramic-polymer composite electrolyte membrane that comprises: (i) a third polymer matrix, (ii) third ceramic nanoparticles with diameters that range from 10 to 2000 nm and that are distributed in the third polymer matrix, (iii) third plasticizer (iv) third lithium salt, wherein the third ceramic nanoparticles are selected from the group consisting of ceramic materials having the formula $Li_7La_3Zr_2O_{12}$ (LLZO) and derivatives thereof wherein at least one of Al, Ta or Nb is substituted in Zr sites of the $Li_7La_3Zr_2O_{12}$.

In the inventive electrochemical cell, the thickness of the Si-based anode can be reduced by 10-25% to that of a conventional graphite anode. The total thickness of the cell can be reduced by 35-40% and the total weight can be reduced by 25-30%, resulting from the combination of high-capacity Si-dominant anode and high-ionic-conductivity solid-state electrolyte (SSE). The inventive electrochemical cell offers high cycle life, which is attributable to the resilience electrolyte confined Si-based material and the intimate contact between the Si-based anode and the SSE layer. The polymeric networking structure of the electrolyte in the Si-anode serves as ionic conductive pathways for electrons and $Li^+$ transport for active material particles during the lithiated/delithiated process. The continuous $Li^+$ conductive network in the Si anode composite produces an anode with higher energy/power performance. The cross-linking structure of the polymeric network or polymer matrix strongly binds all of the Si-based anode components. The composite Si-based anode and composite cathode form good physical interfacial contacts with the composite electrolyte membrane for improved rate performance and cycling stability.

DETAILED DESCRIPTION OF PREFERRED EMBODIMENTS

This invention is directed to ceramic-polymer electrolyte infiltrated silicon-based composite anodes that are particularly suited for use in lithium-ion electrochemical cells and batteries. The mechanically resilient high-ionic-conductivity electrolyte forms a 3-dimensional networking structure within the silicon-based composite anode. The homogeneously distributed components in the polymer matrix establish an effective lithium-ion transport pathway in the Si-based composite anode.

The ceramic-polymer composite anode comprises: (i) a polymer matrix, (ii) ceramic nanoparticles that are distributed in the polymer matrix, (iii) a silicon-based anode active material that is distributed in the polymer matrix, (iv) a conducting agent that is distributed in the polymer matrix, (v) lithium salt, (vi) plasticizer, and (v) optionally, a binder.

The polymer matrix is formed from a mixture of monomers, oligomers or partial polymers thereof (collectively referred to as polymer precursors). Preferred polymer matrices comprise poly(ethylene oxide) (PEO), poly(ethylene glycol diacrylate) (PEGDA), poly(acrylonitrile (PAN), polysiloxane, poly(vinylidene fluoride-co-hexafluoropropylene) [P(VDF-HFP)], poly(methyl methacrylate) (PMMA), and mixtures thereof. The ceramic-polymer composite anode typically includes 0.1 to 10 wt % and preferably 1 to 6 wt % polymer matrix.

The ceramic nanoparticles comprise lithium metal oxides with diameters that range from 10 nm to 2000 nm. Preferred ceramic nanoparticles include $Li_7La_3Zr_2O_{12}$ (LLZO) and derivatives thereof wherein specific quantities of Al, Ta and/or Nb are substituted at the Zr sites. Derivatives include, for example, $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Particularly preferred ceramic nanoparticles are $Al_xLi_{7-x}La_3Zr_{1.75}Ta_{0.25}O_{12}$ (x ranges from 0.01 to 0.85) and $Li_7La_3Zr_{2-y-z}Ta_yNb_zO_{12}$ (z ranges from 0.01 to 0.60) which exhibit improved the ionic transport in the electrode. 10. Preferred ceramic nanoparticles include $Al_xLi_{7-x}La_3Zr_{2-y-z}Ta_yNb_zO_{12}$ wherein x ranges from 0 to 0.85, y ranges from 0 to 0.50, and z ranges from 0 to 0.75, wherein at least one of x, y and z is not equal to 0, and mixtures thereof. Preferred ceramic nanoparticles have a tunable size ranging from 10-2000 nm. The ceramic-polymer composite anode typically includes 0.1 to 15 wt % and preferably 1 to 5 wt % ceramic nanoparticles.

LLZO and derivatives thereof are commercially available, such as from Millipore Sigma (St. Louis, MO) and MSE Supplies (Tucson, AZ). Derivatives of LLZO can be manufactured by standard solid-state techniques using different proportions of $Al_2O_3$, $Ta_2O_5$, and/or $Nb_2O_5$. For example, $Al_xLi_{7-x}La_3Zr_{1.75}Ta_{0.25}O_{12}$ wherein x ranges from 0 to 0.85 is synthesized by mixing stoichiometric amounts of starting powders including $LiOH \cdot H_2O$, $La_2O_3$, $ZrO_2$, $Al_2O_3$ and $Ta_2O_5$ and milling the mixture via high energy ball milling in ethanol media for 8-12 hrs. Zirconia balls (average diameter of 5 mm) balls at a ball-to-powder weight ratio of about 20:1 and about 360 rpm milling speed. After milling, the collected slurry is dried (80° C., 2-3 hrs.), crushed, and sieved (through a 200 mesh), and calcined at about 900° C. for 6 hours to fully decompose LiOH. The as-calcined powders are then ball-milled again in ethanol for 6-12 hrs. Planetary ball mill was used, followed by drying process. The dried powders were pressed into pellets with diameters of about 9.5 mm at about 300 MPa, and then sintered with a temperature range from 800° C. to 1150° C. for about 4 hrs. to obtain particles with size from 100 nm to 2000 nm. Both calcination and sintering processes are carried out with samples in alumina crucibles covered by alumina lids, and the pellets are embedded in corresponding mother powder in order to mitigate losses of volatile components and accidental contamination.

The lithium salt is any lithium salt suitable for solid lithium electrochemical cells. These include, for example, bis(trifluoromethane)sulfonamide lithium salt (LiTFSi), lithium hexafluorophosphate ($LiPF_6$), lithium hexafluoroarsenate ($LiAsF_6$), $LiClO_4$, lithium bis(oxalate)borate (LiBoB), and mixtures thereof. The ceramic-polymer composite anode typically includes 0.1 to 10 wt % and preferably 1 to 5 wt % lithium salt.

The conducting agent is an electronically conductive material that is preferably made of carbon, in particular elemental carbon. The electronically conducting agent can be, for example, carbon black. The ceramic-polymer composite anode typically includes 1 to 15 wt % and preferably 3 to 9 wt % conducting agent.

The plasticizer is a compound that is preferably solid at room temperature (20° C.) and serves as a liquid medium in which the polymer precursors can polymerize to form a polymer matrix. Preferred plasticizers are organic compounds such as succinonitrile (SCN), sulfolane (SL), ethylene carbonate (EC), dimethyl sulfoxide (DMSO), glutaronitrile (GN), propylene carbonate (PC), and mixtures thereof. The ceramic-polymer composite anode typically includes 0.1 to 20 wt % and preferably 1 to 10 wt % plasticizer.

A binder can be used in the electrolyte-infiltrated Si-based composite anode if active material weight percentage is high (for example, >50 wt %). Preferred binders can be polyacrylic acid (PAA), polyvinyl alcohol (PVA), and the mix of thereof. Specifically, the combination of PAA and polyvinyl alcohol (PVA) (PAA-PVA) (PAA: PAA-PVA=50% to 90 wt %), and the combination of partially neutralized PAA (pnPAA) and PVA (pnPAA-PVA) (pnPAA: pnPAA-PVA=50% to 90 wt %). The combination of PAA and PVA solution realize the strong adhesion properties of PAA and mechanical robustness of PVA. The resultant PAA-PVA binder can overcome technical challenges faced by the traditional PVDF binder, such as brittleness, short service life, and poor interface adhesion. The PAA-PVA binder in Si-based composite anode shows higher stiffness, adhesion strength and electrochemical performance in the forms of longer and more stable cycling life. The ceramic-polymer composite anode typically includes 0 to 10 wt % and preferably 1 to 5 wt % binder.

To further enhance the rheological properties and electrode porosity of PAA-PVA binder, Na ions ($Na^+$) can be added to the PAA solution to partially neutralize PAA with a neutralization degree of 5-10%, prior to mixing with PVA solution. PAA polymer chains tend to "self-bond" through its own hydrogen bond. The introduction of NaOH to the PAA solution reduces this situation of PAA. Large amount of $H^+$ are consumed with the addition of $OH^-$. The electrostatic repulsion between neighboring dissociated carbonxylate (—COOH) will make the polyacrylate chain stretched, leading to the enhanced rheological properties of PAA solution. Furthermore, acidic condition has been created with the dissolution of electrolytic dissociation of carbonxyl groups of PAA, which facilitate cross linking between PAA and PVA, leading to a stronger interconnection between different function groups.

The silicon-based anode active material are particles that include a mixture of silicon, graphite, metallic and/or non-metallic oxides, and a polymer coating, which is optional. The ceramic-polymer composite anode typically includes 60 to 96 wt % and preferably 65 to 80 wt % silicon-based anode material.

With respect to the silicon-based anode active material, it typically includes (i) 40 to 90 wt % and preferably 50 to 60 wt % silicon, (ii) 20 to 60 wt % and preferably 5 to 15 wt % graphite, (iii) 5 to 15 wt % and preferably 7 to 12 wt % metal and/or non-metallic oxides and (vi) 0 to 10 wt % and preferably 1 to 5 wt % of a polymer that forms a polymer coating.

Preferred metal oxides include, for example, $TiO_2$, $Al_2O_3$, $Fe_2O_3$, $SnO_2$, and mixtures thereof.

Preferred metal oxides also include, for example, SiO, $SiO_2$, and mixtures thereof; the silicon-based anode active material may also contain SiC.

The optional polymer coating for the silicon-based anode active material serves as a buffer layer and preferably comprises polyvinyl alcohol (PVA), poly(acrylic acid) (PAA), polyvinylidene fluoride (PVF), polyvinylidene difluoride (PVDF), and mixtures thereof.

Figure 1:
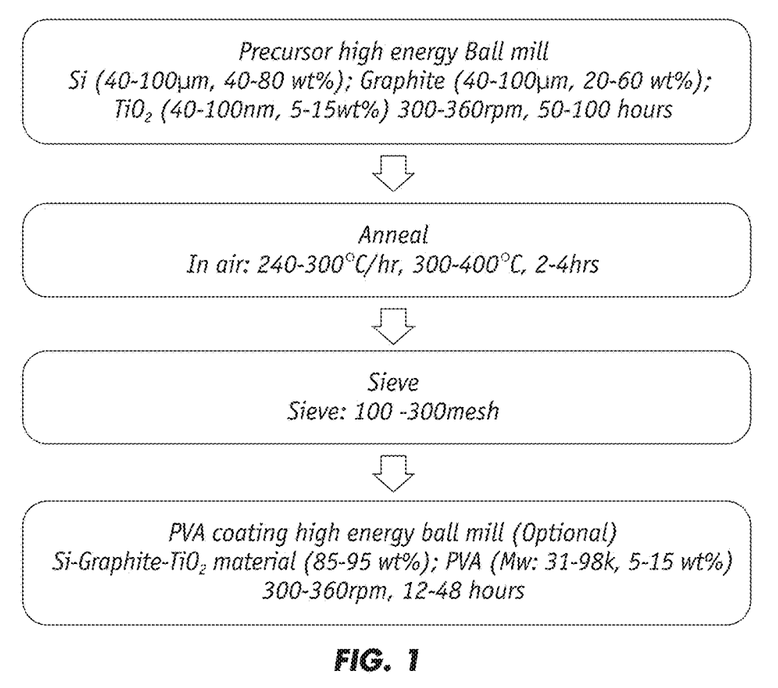
FIG. 1 depicts a process for fabricating Si-based composite anode active materials that are coated with a polymer (e.g. PVA) coating.

A process for fabricating Si-based composite active anode materials is shown in FIG. 1 wherein 40-80% silicon (40-100 μm), 20-60% graphite (40-100 μm), and 5-15% titanium oxide (40-100 nm) are added into a planetary ball milling machine and milled for 10-100 hours at a milling speed of 100-400 rpm. The ball-milled precursor is then annealed in an air furnace at the temperature of 200-400° C. for 1-4 hours. To achieve the Si-based composite powder with a uniform particle size, the annealed powder is sieved through a 100-300 mesh. The sieved Si-based composite active material is ready to use to prepare Si-based anodes that are assembled into ASSLiBs.

To form a polymer coating on the Si-based active material which serves as a polymer buffer layer, polyvinyl alcohol (PVA, Mw: 31-98k, 5-15 wt %) is added to a planetary ball milling machine, along with the sieved Si-graphite-titania composite material in an Argon atmosphere. Ball milling time is set from 12 hours to 48 hours. The PVA polymer covers the Si particle surfaces in the ball-milling process. PVA polymer chains will hold Si particles from huge volume expansion and shrinkage during the charge-discharge process in a further resultant lithium-ion battery. This manufacturing procedure for the Si-based composite material is simple, cost-effective, scalable for large-scale production. The resultant Si-based anode materials made can deliver (1200-3000 mAh/g) much higher (larger than 4 times) specific capacity than traditional graphite anode material (372 mAh/g), leading to a high volumetric and gravimetric energy density of the resultant ASSLiB.

Figure 2A:
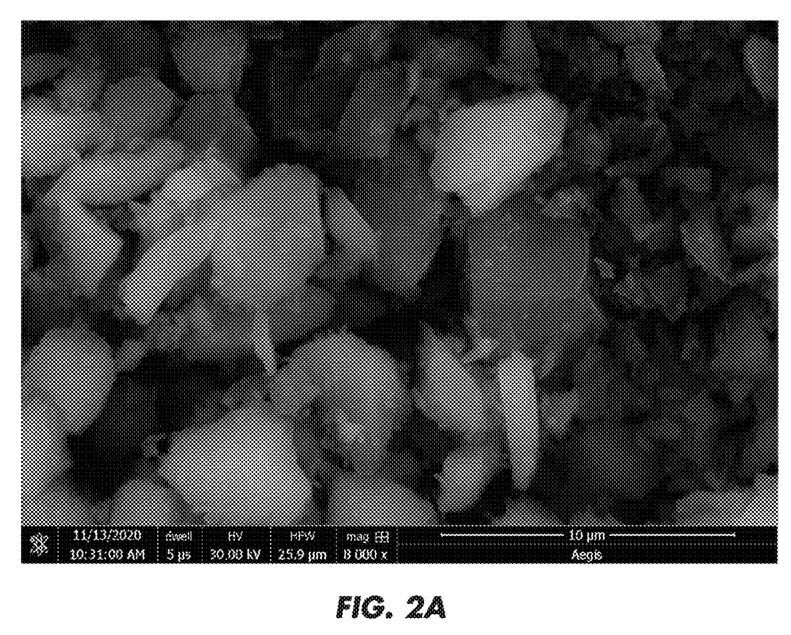
FIG. 2A is a scanning electron microscope (SEM) of pristine Si anode active materials.
Figure 2B:
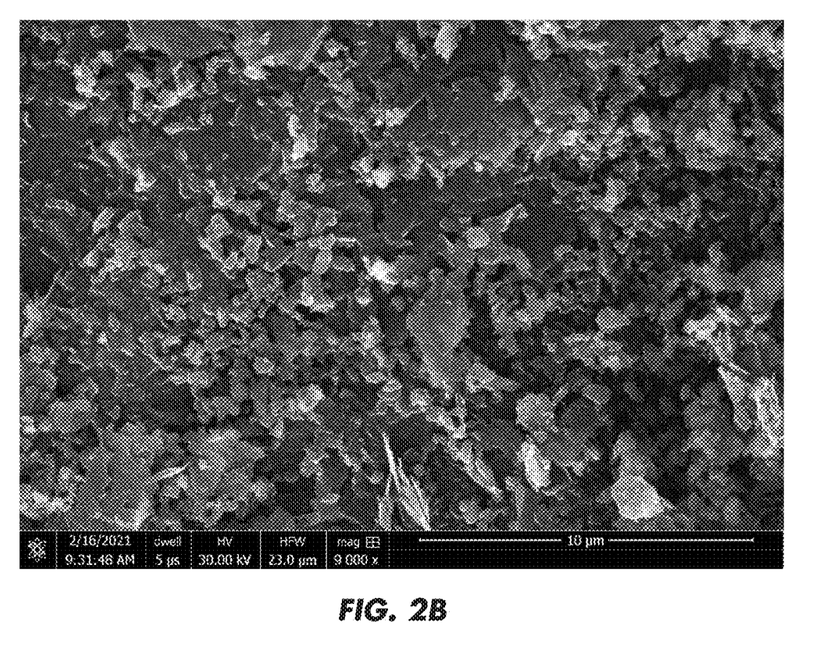
FIG. 2B is a SEM of Si-based anode active materials without PVA coating
Figure 2C:
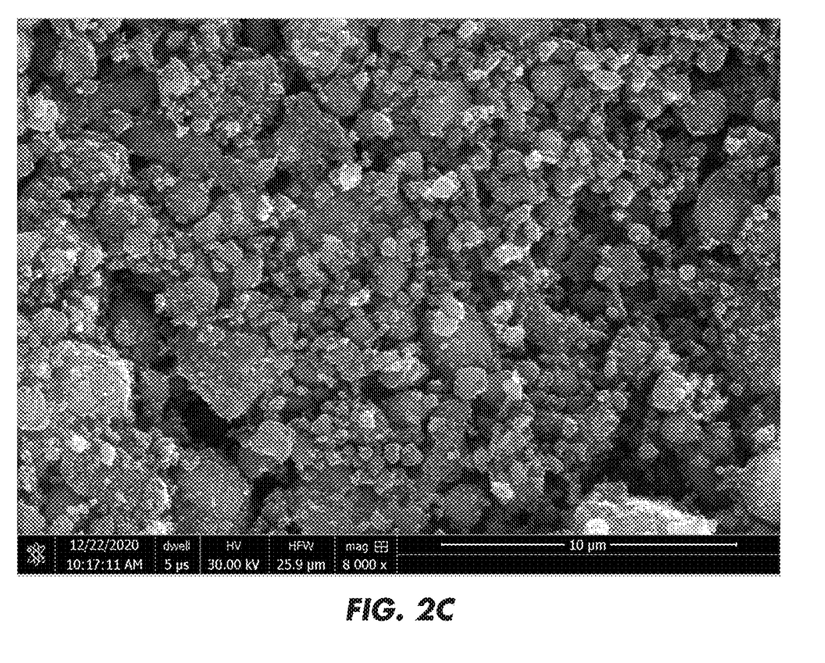
FIG. 2C is a SEM of pristine Si anode active materials with PVA coating.

FIG. 2A is a scanning electron microscope of pristine Si particles (4-8 μm) before processing. FIG. 2B is an SEM image of the Si-based composite anode active material (Si-graphite-titanium oxide, 45:40:15, weight ratio) before coating with a polymer. The composite materials in this image were subject to the high energy ball milling in the air atmosphere for 50 hours and annealed at 350° C. for 2 hours before sieving with 100 mesh. The primary particle size was reduced to 3-4 μm. FIG. 2C is an SEM image of a Si-based composite anode active material (Si-graphite-titanium oxide-PVA) that was coated with a PVA polymer by high energy ball milling in Ar atmosphere. Si-based composite particles are wrapped with resilient PVA coatings that covalently bond to Si particles. The SEM image shows that Si particles are surrounded by fine PVA particles.

Figure 3:
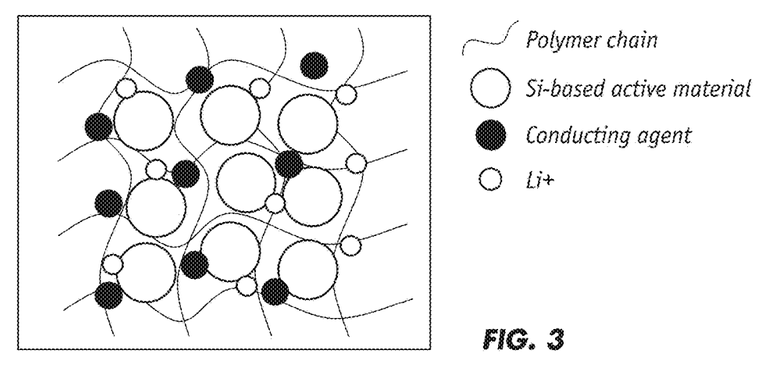
FIG. 3 depicts the networking structure of an electrolyte and the resultant electrolyte-infiltrated composite Si-based anode.

A silicon-based composite electrode as depicted in FIG. 3 has a polymer network or matrix with Si-based anode active materials, conducting agents, lithium ions and ceramic nanoparticles that distributed or infiltrated within the matrix. The Si-based composite anode with its 3-D polymer network structure exhibits (i) enhanced ion-transport and (ii) improved contact with solid electrolytes. Resilient electrolyte surround the Si particles will act as a buffer layer to accommodate the volume change of Si particles during the charge-discharge process.

The active materials for anodes are Si-based composite anodes are infiltrated with solid-state electrolytes. The solid-state electrolyte is mechanically resilient and high-ionic-conductive. It can form a networking structure within the anode to compensate for the volume change of Si particles during charging and discharging. The rigid feature of ceramic nanoparticles compensates and diminishes the deformation of Si particles in the course of charging and discharging. The optional polymer coating outside the Si-based composite particles acts as a buffer layer to Si particles to accommodate the volume change of original Si particles, resulting from its resilient feature. The coating wraps on the Si particle surfaces by covalently bonding. These formed covalent bonds enhance the mechanical strength between Si particles and the coating layer, leading to limited volume change during the repeated lithiation and delithiation, thus enhanced stability and longer cycling life of resultant lithium-ion batteries.

Figure 4:
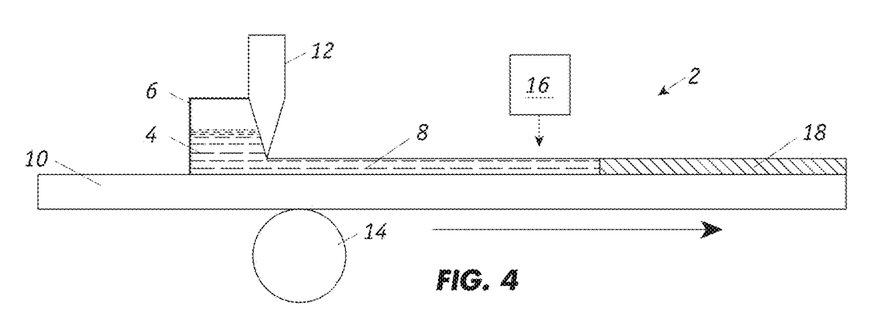
FIG. 4 shows a tape-casting system for preparing the Si-based composite anode.

FIG. 4 shows a tape-casting system 2 for preparing the Si-based composite anode. The Si-based composite anode active materials, conducting agent and binder are preferably dried under vacuum before being added into tank 6. A mixture of polymer precursor and plasticizer is added to tank 6 to form a precursor slurry, which also contains 0.001 wt % to 1.0 wt % of a photoinitiator such as phenyl bis(2,4,6-trimethylbenzoyl) phosphine oxide (819). An adjustable doctor blade 12 coats a wet film 8 of the precursor slurry 4 of the desired thickness onto the current collector foil 10 which is supported by stationary roll 14. UV radiation directed to wet film 8 from UV source 16 initiates in-situ radical polymerization to crosslink the polymer precursor in the Si-based anode composite 18. The monomer or polymer precursors polymerize and/or crosslinked, which establishes a polymer network that has strong interactions with the other components in the electrode. Therefore, the polymer matrix can act as a binder and completely or partially replace the binder if the weight percentage of Si-based composite active material is lower than 80%. It has been found that ceramic nanoparticles accumulate toward the top of the composite electrode so that a ceramic nanoparticle gradient is established within the layer along the direction of the thickness. The upper side of the composite electrode on which the anode is disposed has a higher concentration of ceramic nanoparticles which acts as a barrier to lithium dendrite growth. Large dimensional electrolyte-infiltrated, Si-based composite electrode sheets can be processed with a well-established industrial process that is cost-effective, scalable, and compatible with the currently used Li-ion production line. The resultant Si-based anode sheet can be directly incorporated into the manufacturing of all-solid-state lithium electrochemical pouch cells that would offer high energy density, long cycle life, and high charge/discharge rate.

As an example, to prefabricate an electrolyte-infiltrated composite Si-based anode by tape-casting method without using a binder, a precursor slurry comprising 1 wt % to 10 wt % carbon black, 60 wt % to 96 wt % Si-based anode material, and 1 wt % to 20 wt % polymer precursor are mixed at 50° C. to 70° C. for at least 12 hours in de-ionized water. The typical water-to-solid ratio is 1 ml to 0.5 g~1.0 g solid. The slurry is printed on an anode current collector, typically copper foil, by tape-casting method and the printed sheets are under UV light for 10 minutes. Finally, the sheets are dried, calendared, and cut.

Si-based anodes in the present invention can be incorporated into solid-state lithium-ion electrochemical cells and batteries. A preferred solid-state polymer electrolyte membrane comprises a ceramic-polymer nanocomposite electrolyte that is disclosed in US 2020/0335814, which is incorporated herein by reference. A particularly preferred solid-state electrolyte is a ceramic-polymer composite electrolyte membrane comprises: (i) a polymer matrix, (ii) ceramic nanoparticles with diameters that range from 10 to 2000 nm that are distributed in the polymer matrix, (iii) a plasticizer (iv) a lithium salt, wherein the ceramic nanoparticles are selected from the group consisting of ceramic materials having the basic formula $Li_7La_3Zr_2O_{12}$ (LLZO) and derivatives thereof wherein specific quantities of Al, Ta and/or Nb are substituted at the Zr sit i es. Derivatives include, for example, $Al_xLi_{7-x}La_3Zr_{2-y-x}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Particularly preferred ceramic nanoparticles are $Al_xLi_{7-x}La_3Zr_{1.75}Ta_{0.25}O_{12}$ (x ranges from 0.01 to 0.85) and $Li_7La_3Zr_{2-z}Nb_zO_{12}$ (z ranges from 0.01 to 0.60).

The polymer matrix, ceramic nanoparticles, plasticizer and lithium salt used for the electrolyte membrane can be the same as those used in preparing the inventive ceramic-polymer composite Si-based anode. The ceramic-polymer composite electrolyte membrane typically includes 20 to 60 wt % lithium salt, 5 to 60 wt % ceramic nanoparticles, 10 to 60 wt % plasticizer, and 10 to 50 wt % polymer matrix. The electrolyte membrane exhibits an ionic conductivity of higher than $1 \times 10^{-4}$ S/cm when measured at a temperature in the range of −20° C. to 10° C. and higher than 1×10$^{-3}$ S/cm when measured at a temperature 20° C. or higher.

As an example, to make a solid-state electrolyte membrane. A precursor solution consisting of 10 to 50 wt % polymer precursor, 5 to 60 wt % ceramic nanoparticles, 10 to 60 wt % plasticizer, and 20 to 60 wt % lithium salt is mixed by magnetic stirring for 30-60 min, and poured onto a specifically designed module, with a configuration and size with precisely controlled geometries. For example, a typical module for coin cell has a diameter of ¹¹⁄₁₆ inch (1.75 cm) and height of 0.02 cm. Another typical module for a pouch cell has a rectangular aperture having (L×W×H) dimensions of 6.2 cm×4.6 cm×0.02 cm, respectively. In-situ polymerization is enabled by UV radiation, which is applied to the film for 10-15 min. It yields a free-standing solid-state electrolyte that can be peeled off the module.

Preferred cathodes are ceramic-polymer-infiltrated composite cathodes that typically include 60 to 96 wt % cathode material, 1 to 15 wt % conducting agent, 0.1 to 10 wt % lithium salt, 0.1 to 5 wt % ceramic nanoparticles, 0.1 to 10 wt % plasticizer, 0.1 to 5 wt % polymer matrix and 0 to 15 wt %, binder. The active cathode materials include any compatible cathodic material which functions as a positive pole in a solid lithium electrochemical cell. Preferred cathode active materials which are compatible with the polymer-based electrolyte comprise, for example, sulfur (S), $LiNi_{0.5}Mn_{1.5}O_4$(LNMO), $LiFePO_4$ (LFP), $LiNi_{0.8}Co_{0.1}Mn_{0.1}O_2$(NCM811), $LiNi_{0.5}Co_{0.2}Mn_{0.3}O_2$ (NCM 523) and $LiNi_{0.6}Co_{0.2}Mn_{0.2}O_2$(NCM 622) and mixtures thereof. The polymer matrix, ceramic nanoparticles, plasticizer, lithium salt, and binder used for the composite cathode can be the same as those used in preparing the inventive ceramic-polymer composite Si-based anode.

The active materials for cathodes include any compatible material which functions as a positive pole in a solid lithium electrochemical cell. Preferred cathode active materials which are compatible with the polymer-based electrolyte comprise, for example, $LiFePO_4$ (LFP), $LiNi_{0.8}Co_{0.1}Mn_{0.1}O_2$ (NCM811), $LiNi_{0.5}Co_{0.2}Mn_{0.3}O_2$ (NCM 523) and $LiNi_{0.6}Co_{0.2}Mn_{0.2}O_2$ (NCM 622), $LiNi_{0.5}Mn_{1.5}O_4$ (LNMO), and mixtures thereof.

As an example, to fabricate an electrolyte-infiltrated composite cathode by a tape-casting method without using a binder, 1 wt % to 10 wt % carbon black, 60 wt % to 96 wt % LFP, and 1 wt % to 20 wt % polymer precursors are mixed in N-Methyl-2-pyrrolidone (NMP) solvent. The slurry is printed on a cathode current collector, typically aluminum foil, by tape-casting method and the printed sheets are under UV light for 10 minutes. Finally, the sheets are dried, calendared, and cut.

Lithium electrochemical cells and batteries of the present invention will have excellent rate performance as well as outstanding cycling stability (>1000 cycles) over a wide range of temperatures. Batteries will meet severe specifications for a wide temperature working range, quick charging requirement, and high energy density.

Figure 5A:
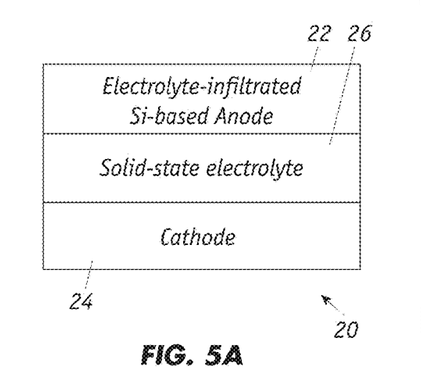
FIG. 5A is an electrochemical cell structure.

FIG. 5A is an electrochemical cell 20 that includes an electrolyte-infiltrated Si-based anode 22, a solid-state electrolyte membrane 26, and a cathode 24. The anode and solid-state electrolyte define a first interface where Si-based anode and solid-state electrolyte meet and form intimate contacts. Similarly, the cathode and solid-state electrolyte define a second interface where cathode and solid-state electrolyte meet and form intimate contacts. The presence of the networking-structure electrolyte in the electrode creates and maintains good intimate contacts which afford superior ion transport and reduced interfacial resistance. A plurality of electrochemical cells can be stacked into batteries.

Figure 5B:
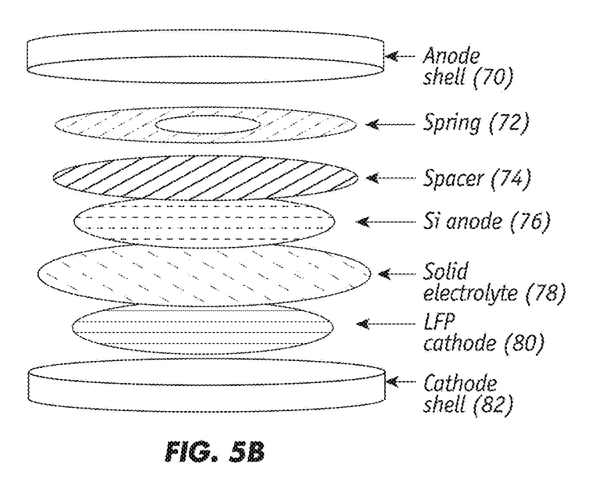
FIG. 5B is an exploded view of a coin cell.
Figure 5C:
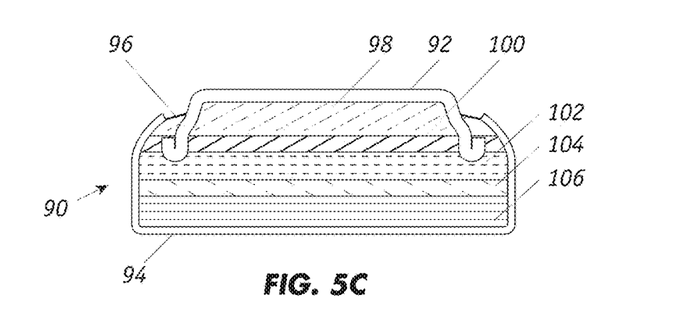
FIG. 5C is a coin cell.

An electrochemical cell can be encapsulated to form a coin cell. As shown in FIG. 5B, the internal components include spring 72, spacer plate 74, Si-based anode 76, solid electrolyte 78, and LFP cathode 80. The anode shell 70 and cathode shell 82 serve as current collectors on the exterior surfaces of the cathode and anode. The shells preferably have planar external surfaces. As shown in FIG. 5C, an assembled lithium electrochemical coin cell 90 has spring 98, spacer 100, anode 102, solid electrolyte 104, and cathode 106 that are positioned between two electrode shells 92, 94. Crimping encases the entire structure with a plastic gasket 96 which electronically separates the shells. When conducting a plain plate calendar for coin cells, the cell is placed between two dies of the crimping machine, where two dies are wrapped by copper plate. A high-pressure crimper typically applies a pressure of about 100 to 1500 psi.

Figure 5D:
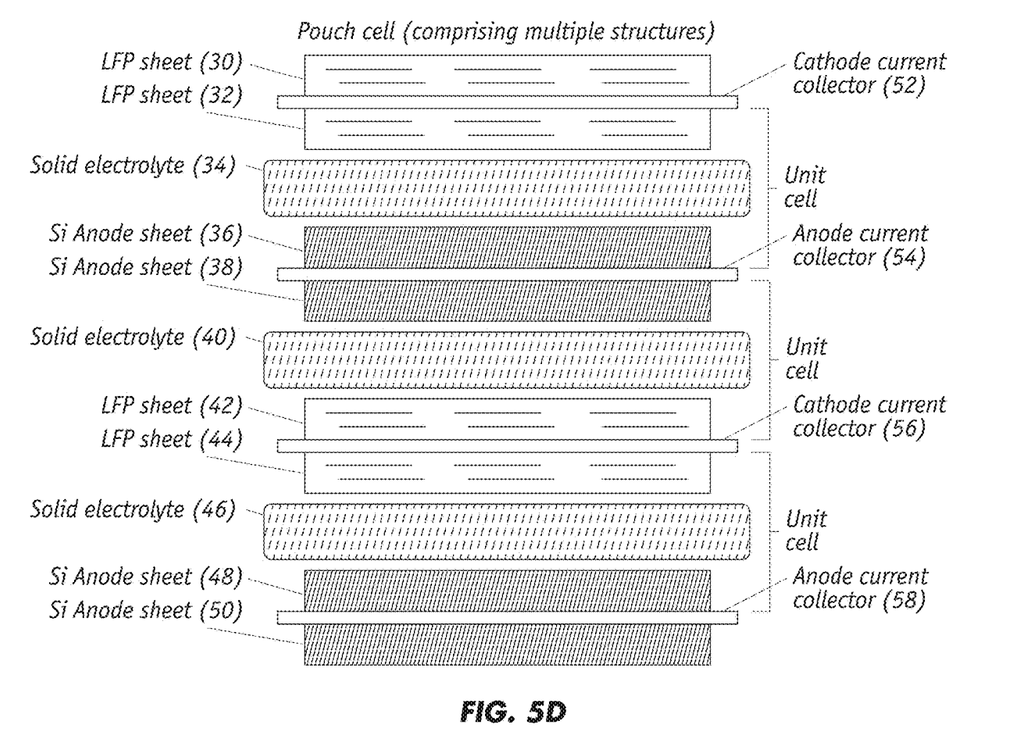
FIG. 5D is a multiple unit cell structure for a pouch cell.

Electrochemical cells can also be encapsulated to form a pouch cell type battery as shown in FIG. 5D which includes a plurality of unit cells. In this configuration, the pouch cell includes LFP cathode sheets 30 and 32 that are connected to cathode current collector 52, anode graphite sheets 36 and 38 that are connected to anode current collector 54, LFP cathode sheets 42 and 44 that are connected to cathode current collector 56, and anode graphite sheets 48 and 50 that are connected to anode current collector 58. Solid electrolytes 34, 40, and 46 are positioned between the anodes and cathodes as shown.

Figure 6:
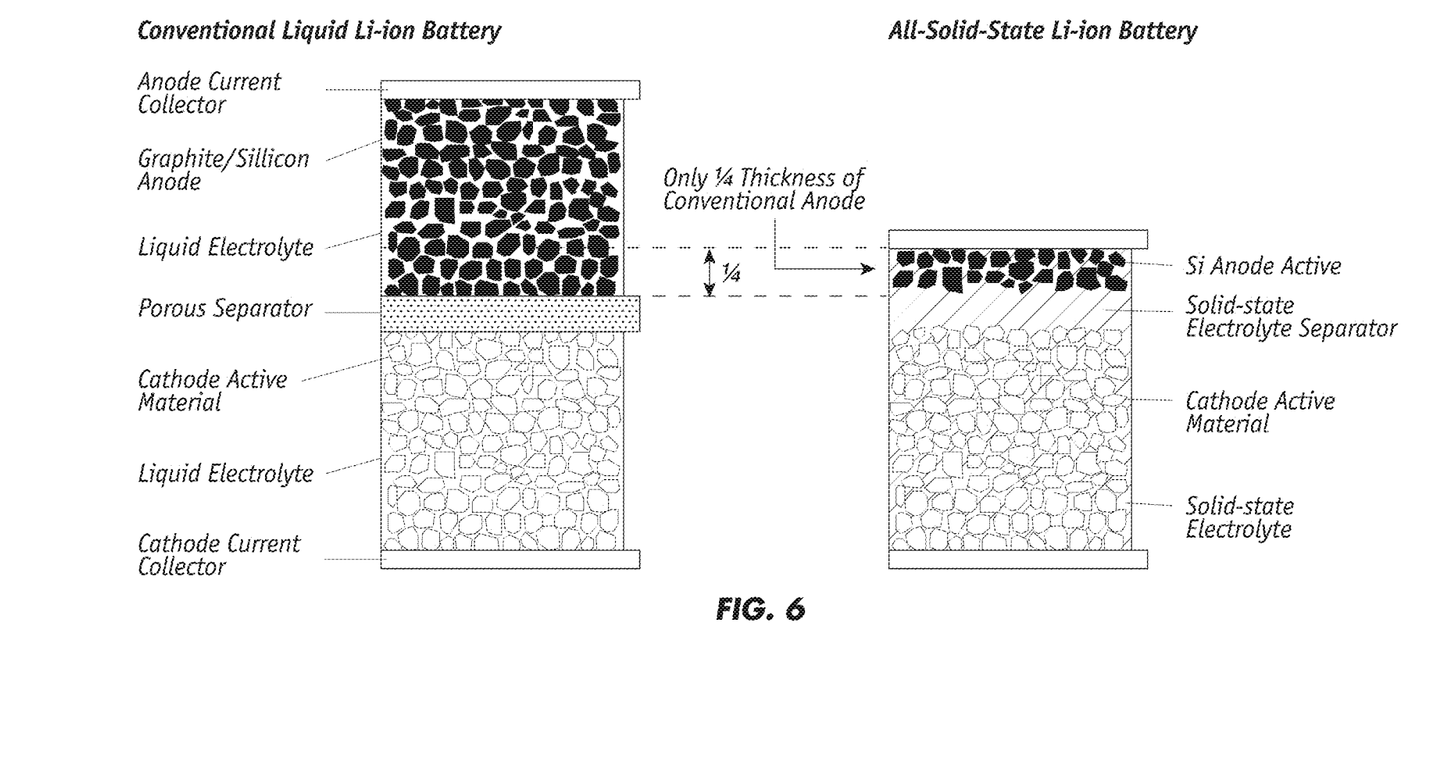
FIG. 6 is a schematic illustration comparing an ASSLiB having an electrolyte-infiltrated Si-based composite anode to a conventional liquid Li-ion battery.

FIG. 6 shows the structures of a conventional liquid Li-ion battery and of an ASSLiB that has the electrolyte-infiltrated Si-based composite anode. The electrolyte-infiltrated Si-dominant anode helps achieve high energy density and fast discharging rate. The mechanically resilient and electronically high-ionic-conductivity electrolyte form a 3-dimensional polymer matrix in the Si-based anode. The networking structure created by the infiltrated electrolyte creates pathways for lithium ions transport within the Si anode, and also between the Si anode and the solid-state electrolyte. These pathways improve the efficiency and the rate of Li ion transfer; the ALLLiBs exhibit high-rate capability and high specific discharge capacity. The electrolyte-infiltrated Si-anode also enables intimate contact between the Si anode surface and the solid-state electrolyte surface due to the strong networking connection from the same polymer in the Si anode and the solid-state electrolyte. This contact between the Si anode layer and the electrolyte layer remains intact during repeated lithiation and delithiation, resulting in long cycling life (>1000 cycles) of the resultant cell. Furthermore, the high specific capacity of the Si-based anode active material in the present patent (>1300 mAh/g @0.2 C) is more than 4 times of the conventional graphite anode's (~314 mAh/g @0.2 C). If batteries with the same capacity are fabricated, the thickness of Li-ion battery anode with Si-based anode in the present patent can reduce by 75% as compared with conventional graphite anode (only 25% of graphite anode thickness) as illustrated. This arrangement translates the total thickness reduction up to 35-40% (around ⅜ of the total thickness) and about 25-30% weight.

Half coin cells containing a Si-based anode, solid-state electrolyte membrane, and lithium metal electrode were evaluated. The Si-based anode comprised 60 wt % Si-based active material, 15 wt % PAA-based binder, 5 wt % LLZO, 10 wt % solid-state electrolyte, and 10 wt % carbon black. The solid-state electrolyte membrane positioned between the Si-based anode and lithium comprised 13 wt % polymer matrix that was derived from PEGDA, 38 wt % EC, 33 wt % LiTFSi and 17 wt % $Al_{0.15}Li_{6.85}La_3Zr_{1.75}Ta_{0.25}O_{12}$ with diameters that ranged from 10 to 2000 nm. The electrolyte infiltrated in the Si-based anode comprised 15 wt % polymer matrix that was derived from PEGDA, 45 wt % EC, 40 wt % LiTFSi.

Figure 7A:
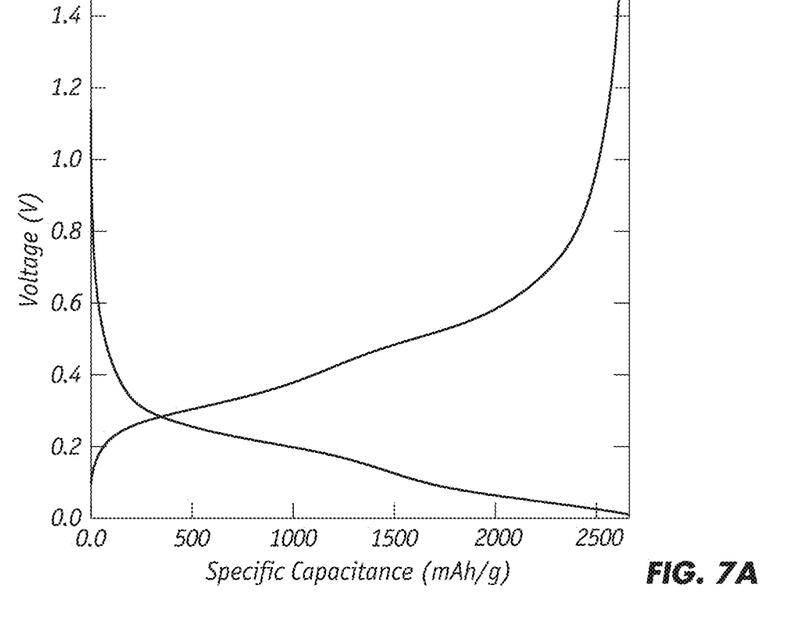
FIGS. 7A and 7B are charge-discharge profiles and cycling profiles, respectively, for a half coin cell with the electrolyte-infiltrated Si-based anode and solid-state electrolyte.

FIG. 7A is a charge-discharge profile of the half coin cell with the electrolyte-infiltrated Si-based anode and solid-state electrolyte described above. The Si anode delivers a discharge specific capacity of larger than 2500 mAh/g at 0.1 C, which is significantly higher performance than for conventional graphite anode with only 372 mAh/g theoretical specific capacity. The high capacity of the Si-based anode enables the reduction in thickness of the anode (35-40%), the weight of the anode (25-30%), thus the total weight of resultant Li-ion battery (25-30%), as compared to conventional liquid lithium-ion batteries. The battery energy densities have been improved, both volumetrically (140-170%) and gravimetrically (130-150%).

Figure 7B:
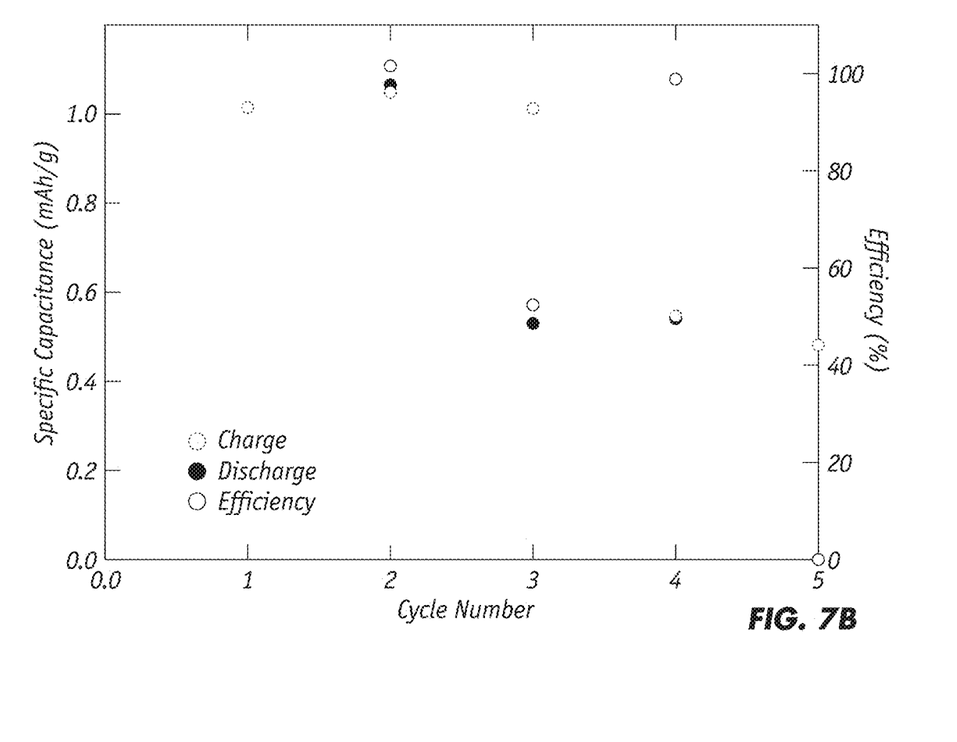

FIG. 7B is a cycling profile of the half coin cell which was tested at 0.1 C for the first three cycles and then at 0.2 C for the rest of cycles. The discharge capacity is steady above 2500 mAh/g at 0.1 C and steady above 1400 mAh/g at 0.2 C during the tested cycles. The polymer matrix in the Si anode prevents the Si particles from deformation during the charge-discharge process, along with the polymer coating on the original Si particles.

Full coin cells with an electrolyte-infiltrated composites Si-based anode/SSE/electrolyte-infiltrated LNMO cathode was made and tested. Full coin cells with electrolyte-infiltrated graphite anode/SSE/electrolyte-infiltrated LNMO cathode were also made and tested for comparison. The electrolyte infiltrated Si-based anode designated A1 comprised 55 wt % Si-based active material, 20 wt % PAA-based binder, 5 wt % $TiO_2$, 10 wt % solid state electrolyte, and 10 wt % carbon black. The electrolyte infiltrated in the Si-based anode and cathodes comprised 15 wt % polymer matrix that was derived from PEGDA, 45 wt % EC, 40 wt % LiTFSi. The solid-state electrolyte membrane positioned between the Si-based anode and cathode comprised 13 wt % polymer matrix that was derived from PEGDA, 38 wt % EC, 33 wt % LiTFSi and 17 wt % $Al_{0.15}Li_{6.85}La_3Zr_{1.75}Ta_{0.25}O_{12}$ with diameters that ranged from 10 to 2000 nm. For comparison, the electrolyte-infiltrated graphite anode designated A2 comprised 80 wt % graphite, 12 wt % SSE, 4 wt % PVDF, and 4% carbon black. LNMO cathode comprised 80 wt % graphite, 12 wt % SSE, 4 wt % PVDF, and 4% carbon black.

Figure 8A:
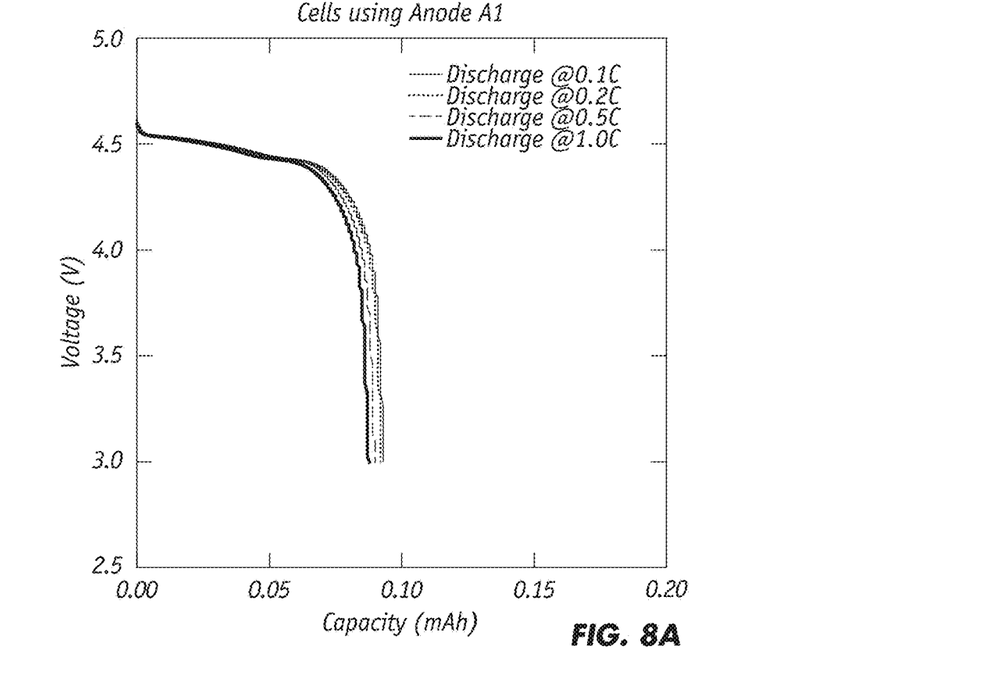
FIGS. 8A and 8B are charge-discharge profiles for coin cells with $LiMn_{1.5}Ni_{0.5}O_4$ (LNMO) cathodes and different anodes.
Figure 8B:
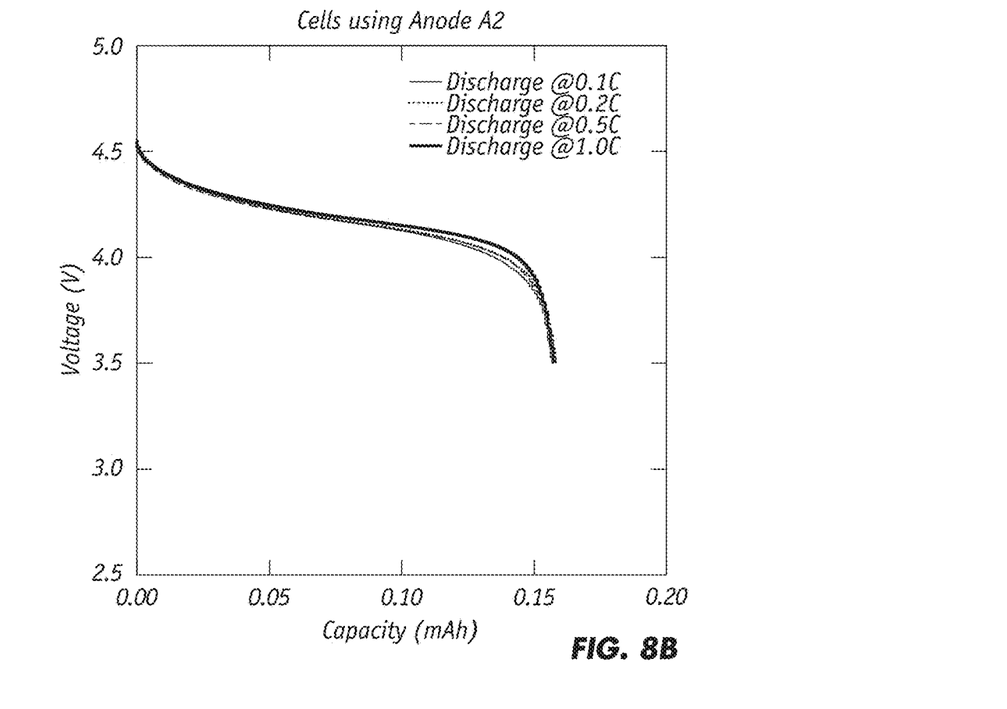

FIGS. 8A and 8B are the charge-discharge profiles of coin cells with graphite anode and electrolyte-infiltrated Si-based anode, respectively. The solid-state electrolyte and LNMO cathode used in these cells are the same. The cells were tested at 0.1 C, 0.2 C, 0.5 C, and LOC. The cell with the electrolyte-infiltrated Si-anode and LNMO cathode delivered capacity around 0.15 mAh and shows no capacity reduction when the testing rate increased from 0.1 C to LOC. The cell with graphite anode and LNMO cathode only has 0.10 mAh and delivers less capacity when the testing rate has increased from 0.1 C to 1.0 C. The cells with electrolyte-infiltrated Si anode can deliver 1.5 times of total capacity, comparing with the cell with the traditional graphite anode. The high specific capacity of the Si-based composite anode material (>1300 mAh/g @0.2 C) enables less anode material weight, less volume, and higher delivering capacity of the resultant cells.

Figure 9A:
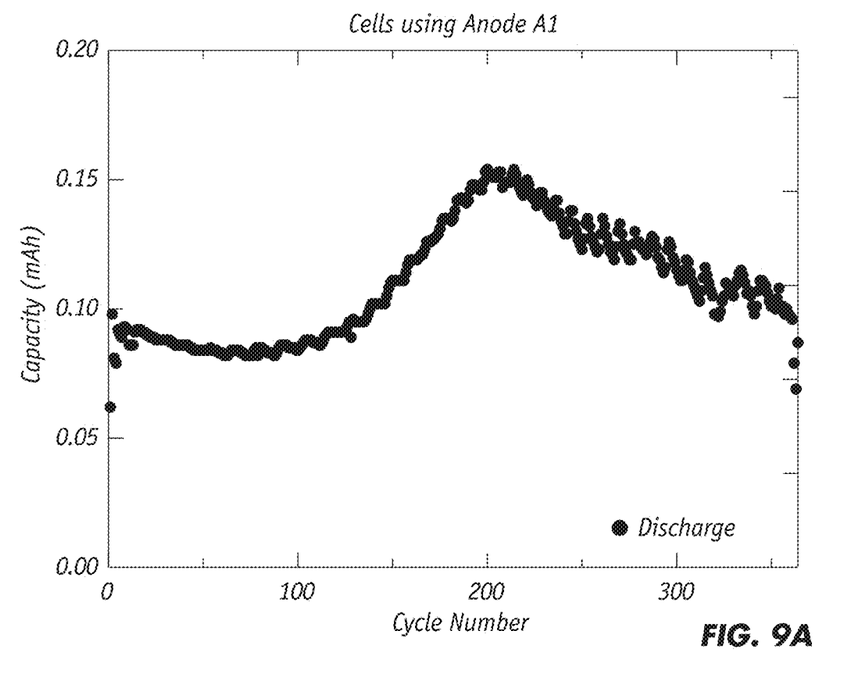
FIGS. 9A and 9B are cycling profiles for coin cells with LNMO cathodes and different anodes.
Figure 9B:
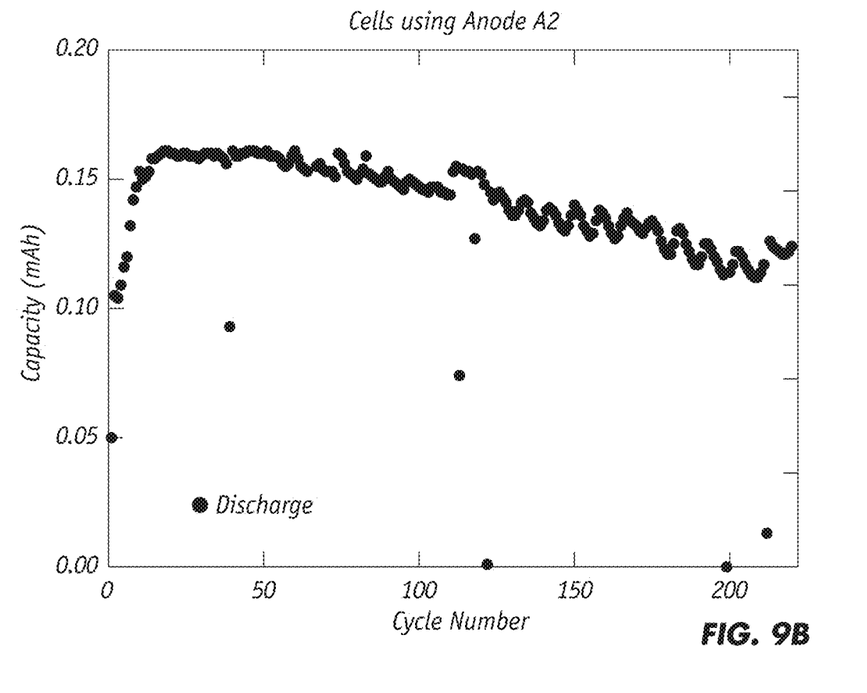

FIGS. 9A and 9B are the cycling profiles of coin cells with graphite anode and electrolyte-infiltrated Si-based anode, respectively. Cells with LNMO/SSE/Si structure show excellent cycling stability with 95% capacity retention up to ~150 cycles. The capacity of cells with electrolyte-infiltrated Si-based anode dramatically increased from 0.10 mAh to 0.16 mAh after 10 cycles at 0.2 C while it takes 200 cycles for graphite anode to show capacity increasing. The stable cycling performance of the Si-based anode, resulting from the resilience polymer structure which is formed by the infiltrated electrolyte. The buffer layer provided by the polymer networking structure prevented the deformation of Si particles during the repeated lithiation and delithiation, leading to long cycling life (>1000 cycles).

Full coins with Si infiltrated by SSE and NCM811 cathode materials were tested. The structure of the full coin cell was an electrolyte-infiltrated composites Si-based anode/SSE/electrolyte-infiltrated NCM811 cathode. The electrolyte infiltrated Si-based anode comprised 60 wt % Si-based active material, 15 wt % PAA-based binder, 5 wt % ceramic particles, 10 wt % solid-state electrolyte, and 10 wt % carbon black. The electrolyte infiltrated in the Si-based anode and cathodes comprised 15 wt % polymer matrix that was derived from PEGDA, 45 wt % EC, 40 wt % LiTFSi. The solid-state electrolyte membrane positioned between the Si-based anode and cathode comprised 13 wt % polymer matrix that was derived from PEGDA, 38 wt % EC, 33 wt % LiTFSi, and 17 wt % $Al_{0.15}Li_{6.85}La_3Zr_{1.75}Ta_{0.25}O_{12}$ with diameters that ranged from 10 to 2000 nm. NCM811 cathode materials comprised 80 wt % graphite, 12 wt % SSE, 4 wt % PVDF, and 4% carbon black.

Figure 10A:
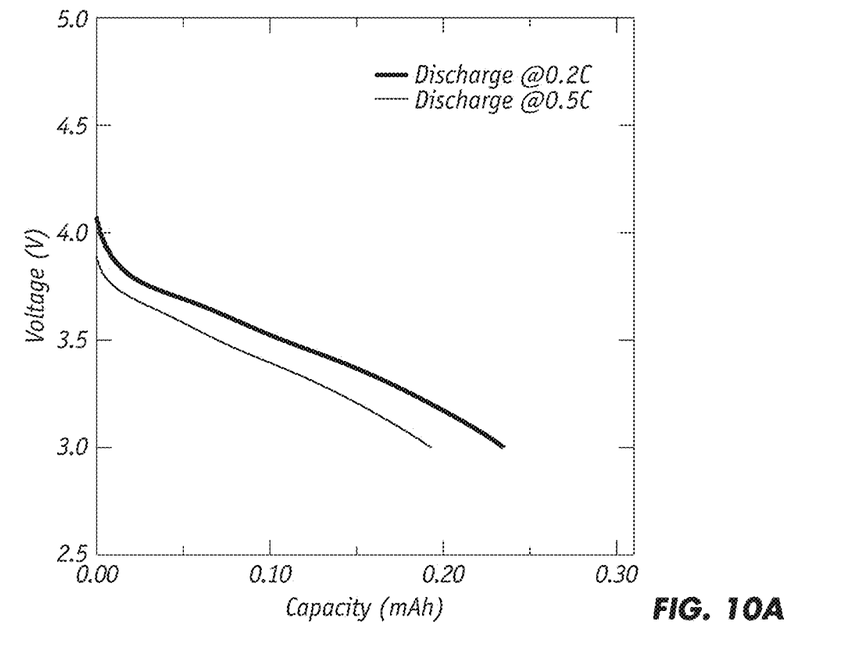
FIGS. 10A and 10B are the charge-discharge profiles and cycling stability profiles, respectively, for coin cells with $LiNi_{0.8}Co_{0.1}Mn_{0.1}O_2$ (NCM811) cathodes.
Figure 10B:
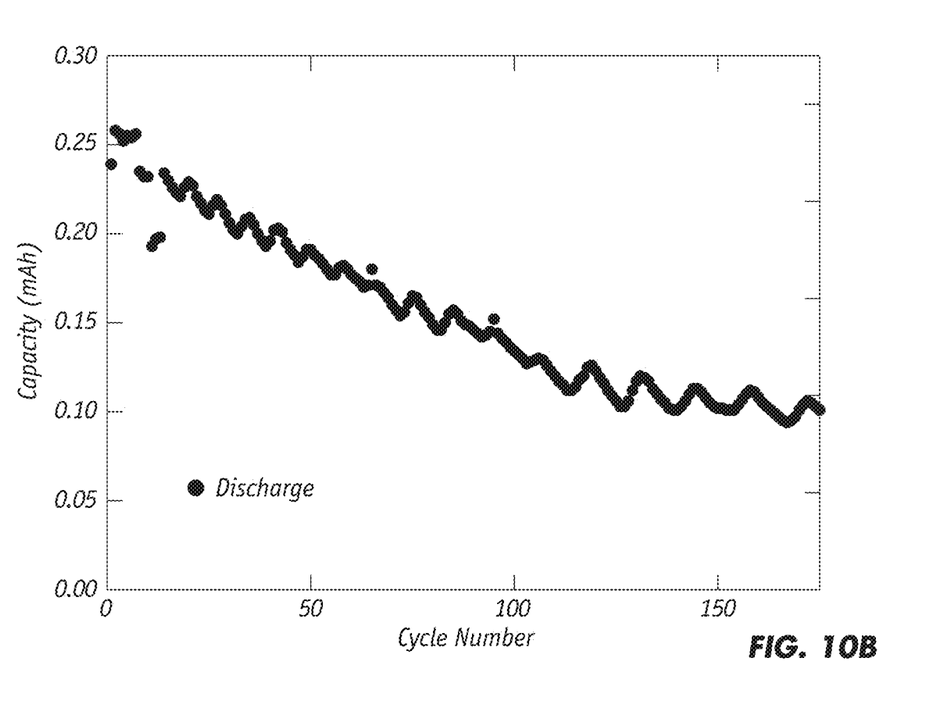

FIG. 10A and FIG. 10B are rate performance and cycling stability data of the full cells which comprised electrolyte-infiltrated Si-based composite anode and NCM811 cathode. The cells were charged/discharged at 0.2 C for the first 2 cycles, and 0.5 C for the cycling stability test. Cells delivered 0.25 mAh at 0.2 C and 0.20 mAh at 0.5 C. The maximum capacity of the cells was 0.25 mAh. The total capacity of the cells maintained above 0.15 mAh for the first 100 cycles.

The foregoing has described the principles, preferred embodiment, and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A process for preparing a solid-state lithium-ion battery cell which comprises:
   (a) providing a ceramic-polymer-infiltrated composite silicon-based anode that comprises: (i) a first polymer matrix, (ii) first ceramic nanoparticles that are distributed in the first polymer matrix, (iii) a first lithium salt, (iv) a first plasticizer, (v) an anode active material that is distributed in the first polymer matrix, (vi) a first conducting agent that is distributed in the first polymer matrix, (vii) a first binder if the weight ratio of the anode active material is greater than 80 wt %;
   (b) providing a ceramic-polymer-infiltrated composite cathode that comprises: (i) a second polymer matrix, (ii) second ceramic nanoparticles that are distributed in the second polymer matrix, (iii) a second lithium salt, (iv) a second plasticizer, (v) a cathode active material that is distributed in the second polymer matrix, (vi) a second conducting agent that is distributed in the second polymer matrix, (vii) a second binder if weight ratio of cathode active material is greater than 80 wt %; and (c) forming a sold-state electrolyte between the cathode and anode which comprises ceramic-polymer composite electrolyte membrane that comprises: (i) a third polymer matrix, (ii) third ceramic nanoparticles with diameters that range from 10 to 2000 nm and that are distributed in the third polymer matrix, (iii) third plasticizer (iv) third lithium salt, wherein the third ceramic nanoparticles are selected from the group consisting of ceramic materials having the formula $Li_7La_3Zr_2O_{12}$ (LLZO) and derivatives thereof wherein at least one of Al, Ta or Nb is substituted in Zr sites of the $Li_7La_3Zr_2O_{12}$.

2. The process of claim 1 wherein the silicon-based anode active material comprises anode active particles that include a mixture of silicon, graphite, and metallic oxides.

3. The process of claim 2 wherein the anode active particles include a polymer coating.

4. The process of claim 2 wherein the anode active particles are formed by (i) balling milling a mixture containing the silicon, graphite and metallic oxides to form a precursor and (ii) annealing the precursor to form the anode active particles.

5. The process of claim 4 further comprising step (iii) of applying a polymer coating onto the anode active particles.

6. The process of claim 2 wherein the anode active particles comprise 50 to 60 wt % silicon, 5 to 15 wt % graphite, 7 to 12 wt % metallic oxides, and 1 to 5 wt % polymer.

7. The process of claim 2 wherein the anode active particles comprise $TiO_2$ or $SiO_2$.

8. The process of claim 1 wherein composite silicon-based anode comprises (i) 1 to 6 wt % first polymer matrix, (ii) 1 to 5 wt % first ceramic nanoparticles, (iii) 65 to 80 wt % silicon-based anode active material, (iv) 3 to 9 wt % first conducting agent, (v) 1 to 5 wt % first lithium salt, (vi) 1 to 10 wt % first plasticizer, and 1 to 5 wt % first binder.

9. The process of claim 1 wherein the first ceramic nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$.

10. The process of claim 9 wherein the derivative is $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof.

11. The process of claim 1 wherein the first ceramic nanoparticles comprise $Li_7La_3Zr_{2-z}Nb_zO_{12}$ wherein z ranges from 0.01 to 0.60.

12. The process of claim 1 wherein the first ceramic nanoparticles comprise $Al_xLi_{7-x}La_3Zr_{2-y-z}Ta_yNb_zO_{12}$ wherein x ranges from 0 to 0.85, y ranges from 0 to 0.50, and z ranges from 0 to 0.75, wherein at least one of x, y and z is not equal to 0, and mixtures thereof.

13. The process of claim 1 wherein the first ceramic nanoparticles have a tunable size ranging from 10-2000 nm.

14. The process of claim 1 wherein the membrane has an ionic conductivity of higher than $1 \times 10^{-4}$ S/cm when measured at a temperature in the range of $-20°$ C. to $10°$ C. and higher than $1 \times 10^{-3}$ S/cm when measured at a temperature $20°$ C. or higher.

15. The process of claim 14 wherein the first polymer matrix, second polymer matrix and third polymer matrix are derived from the same polymer precursors.

16. The process of claim 15 wherein each of the first polymer matrix, second polymer matrix, and third polymer matrix comprises PEO, PEGDA, PAN, P(VDF-HFP), or PMMA.

17. The process of claim 1 wherein the second ceramic nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$.

18. The process of claim 17 wherein the derivative is $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof.

19. The process of claim 1 wherein the second ceramic nanoparticles comprise $Li_7La_3Zr_{2-z}Nb_zO_{12}$ wherein z ranges from 0.01 to 0.60.

20. The process of claim 1 wherein the second ceramic nanoparticles have a tunable size ranging from 10-2000 nm.

* * * * *